(12) United States Patent
Saucier et al.

(10) Patent No.: US 9,157,276 B2
(45) Date of Patent: Oct. 13, 2015

(54) LADDER ACCESSORY

(71) Applicants: Kayenta Saucier, Seymour, CT (US);
Andrew M. Visinski, Shelton, CT (US);
Josef F Visinski, Shelton, CT (US);
Adam Goldberg, North Haven, CT (US)

(72) Inventors: Kayenta Saucier, Seymour, CT (US);
Andrew M. Visinski, Shelton, CT (US);
Josef F Visinski, Shelton, CT (US);
Adam Goldberg, North Haven, CT (US)

(*) Notice: Subject to any disclaimer, the term of this patent is extended or adjusted under 35 U.S.C. 154(b) by 6 days.

(21) Appl. No.: 14/095,194

(22) Filed: Dec. 3, 2013

(65) Prior Publication Data

US 2014/0263897 A1    Sep. 18, 2014

Related U.S. Application Data

(63) Continuation-in-part of application No. 13/832,368, filed on Mar. 15, 2013, now abandoned.

(60) Provisional application No. 61/616,459, filed on Mar. 28, 2012.

(51) Int. Cl.
*E06C 7/14* (2006.01)

(52) U.S. Cl.
CPC ........................................ *E06C 7/143* (2013.01)

(58) Field of Classification Search
CPC .............. E06C 7/143; E06C 7/00; E06C 7/14
See application file for complete search history.

(56) References Cited

U.S. PATENT DOCUMENTS

| | | | |
|---|---|---|---|
| 3,980,264 A * | 9/1976 | Tomasik | 248/210 |
| 4,445,659 A * | 5/1984 | LaChance | 248/210 |
| 4,662,594 A * | 5/1987 | Dubis | 248/238 |
| 4,702,446 A * | 10/1987 | Brown | 248/210 |
| 4,913,394 A | 4/1990 | Schmid | |
| 5,135,193 A | 8/1992 | Parris | |
| 5,181,682 A | 1/1993 | Indelicato | |
| 5,293,957 A | 3/1994 | Lunden, Jr. | |
| 5,934,632 A | 8/1999 | Weaver | |
| 6,076,636 A | 6/2000 | Tietge | |
| 6,254,045 B1 | 7/2001 | Oatsvall | |
| 6,260,663 B1 | 7/2001 | Combs | |
| 6,352,135 B1 | 3/2002 | Jones | |
| 6,766,990 B1 | 7/2004 | Hileman et al. | |
| 7,905,458 B2 | 3/2011 | Hohensee | |
| 2008/0017771 A1 | 1/2008 | Anderson | |

* cited by examiner

*Primary Examiner* — Amy Sterling
(74) *Attorney, Agent, or Firm* — Buckingham, Doolittle & Burroughs, LLC

(57) ABSTRACT

A ladder accessory device for insertion into an opening in a prior art ladder rung, wherein the ladder accessory device provides an elevated work environment that is out of the path of an individual ascending/descending the ladder. The accessory device is preferably comprised of a rung insert, a rung insert locking device, a support arm, a platform arm, and a platform arm locking device. The rung insert locking device permits the support arm to be rotated about the rung insert locking device, and the platform arm is likewise rotatable about the support arm. A wide arrange of accessories may also be removably attached to the platform to increase the overall usefulness of the device.

17 Claims, 6 Drawing Sheets

LADDER ACCESSORY

CROSS-REFERENCE

This application is a continuation-in-part application of U.S. Ser. No. 13/832,368 filed on Mar. 15, 2013, which claims priority from Provisional Patent Application Ser. No. 61/616,459 filed on Mar. 28, 2012.

FIELD OF THE INVENTION

This invention relates to a ladder accessory for securely supporting a user's tools and materials alongside a ladder in an elevated work environment. More specifically, the ladder accessory is suspended from an open ladder rung on the exterior side of a ladder rail, and provides a work platform for the user to temporarily store his or her tools and other supplies in an elevated work environment. Because the accessory is positioned on the exterior side of a ladder rail, neither the accessory nor the tools and supplies stored thereon interfere with the user's ascending or descending the ladder. The ladder accessory is relatively easy to install and use, inexpensive to manufacture, and can be used in conjunction with a variety of ladders and to support a wide variety of tools, supplies and work platforms.

BACKGROUND

Many individuals use ladders, such as extension ladders, to perform work on their homes and other structures, or to access elevated positions. For example, many individuals use an extension ladder to paint elevated portions of their homes, or to trim branches on a tree that could not be otherwise accessed from ground level. When working on a ladder, the individual typically requires access to a variety of tools and/or supplies. However, it can be both time consuming and dangerous for the individual to have to ascend and descend a ladder each time the individual requires a different tool or supply, particularly if the individual must use one of his or her hands to carry the tool or supply while ascending/descending the ladder.

To overcome such difficulties, some individuals will attempt to carry multiple tools and/or supplies up the ladder in a single trip and then attempt to position said tools and/or supplies on one or more of the ladder rungs. However, this practice is dangerous for a number of reasons. First, the items stored on the ladder rung create a climbing hazard for an individual ascending or descending the ladder. Additionally, the items stored on the ladder rung could fall from the ladder and cause damage to individuals or property below the ladder rung. Even if a falling tool or supply does not cause injury or property damage, it still necessitates the individual having to make an additional trip up and down the ladder to retrieve the fallen item.

In an attempt to overcome the aforementioned problems, other individuals may wear a tool belt or other harness to enable the individual to transport tools and/or supplies up and down a ladder and to store the tools and supplies when in an elevated work environment. However, tool belts and harnesses laden with tools can weigh an individual down or cause the individual to lose balance while ascending/descending a ladder. Tool belts also tend to be bulky and may limit the individual's mobility.

Consequently, there exists in the art a long-felt need for an accessory device that can be removably attached to a ladder, such as an extension ladder, and that can serve as an elevated work platform for the temporary storage of tools, supplies and other items. There also exists in the art a long felt need for an accessory work platform device that can be easily positioned and repositioned along the outside rail of a ladder and out of the path of an individual ascending/descending the ladder, thereby greatly improving safety without sacrificing accessibility. Finally, there is a long-felt need for an accessory device that accomplishes all of the forgoing objectives and that is relatively inexpensive to manufacture, aesthetically pleasing, and safe and easy to use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is a ladder accessory device useful for temporary storage of tools and other supplies in an elevated work environment and out of the path of an individual ascending/descending the ladder. The accessory device is preferably comprised of a rung insert, a rung insert locking device, a support arm, a platform arm, and a platform arm locking device. The rung insert locking device permits the support arm to be rotated and repositioned about the rung insert, and locked into position. More specifically, the handle on the rung insert locking device may be rotated in a clockwise direction, thereby causing the rung insert to both grip the interior of the ladder rung (as explained more fully below) and to also prevent further rotation of the support arm about the rung insert. The platform arm locking device permits the platform arm to be rotated and repositioned about the support arm. A wide range of accessories may also be removably attached to the outboard end of the platform arm to increase the overall usefulness of the device.

The ladder accessory device of the present invention allows an individual to temporarily store a wide variety of tools and supplies in an elevated work environment, wherein said tools and supplies are easily accessible to the individual on the ladder but do not impede the individual's ability to freely and safely ascend/descend the ladder. The ladder accessory device is easily repositionable along the outside portion of the ladder rail, thereby enabling the individual to utilize the work platform at various elevations with minimal effort. Finally, the ladder accessory device of the present invention accomplish all of the forgoing objectives and is relatively inexpensive to manufacture, and safe and easy to use.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
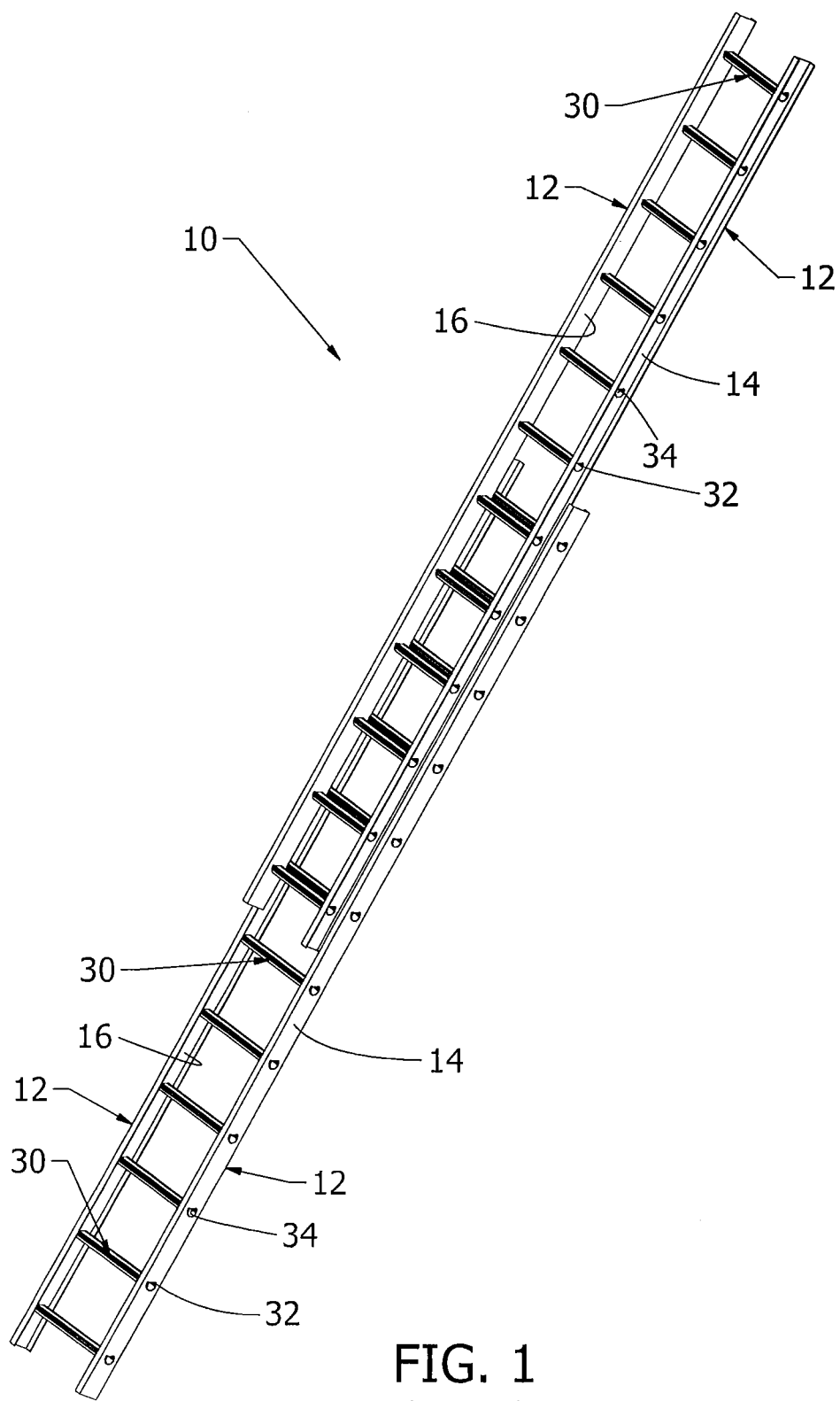
FIG. 1 illustrates a perspective view of a prior art extension ladder with which the device of the present invention can easily be used.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

Referring initially to the drawings, FIG. 1 illustrates a perspective view of a prior art extension ladder 10. Each ladder portion of extension ladder 10 is preferably comprised of two rails 12 in spaced apart and generally parallel relationship to one another, and a plurality of rungs 30 that extend between and connect said rails 12 to one another. Each of rails 12 further comprise an exterior surface 14 that faces in the opposite direction of the opposing rail 12, an interior surface 16 that faces in the general direction of the opposing rail 12, and a plurality of openings in spaced apart relationship along rail 12. Each of said openings typically extend through rail 12 from exterior surface 14 to interior surface 16 for receipt of a rung 30.

Rungs 30 further comprise opposing end portions 32, and may be solid masses or hollow with a continuous opening 34 (typically oval, circular or generally D-shaped) therein that extends between end portion 32. Nonetheless, most ladders 10 have hollow rungs 30 to lessen the overall weight of the ladder and to lower manufacturing costs, as well as for other reasons. Ladder 10 is well known in the art and is available in many different embodiments including, without limitation, a single non-extendable ladder, extension ladders, step ladders, etc. While it is contemplated that the ladder accessory device of the present invention could be used with any prior art ladder 10 with a hollow rung 30, for purposes of discussion an extension ladder 10 is used as an example and is not meant to be a limitation.

Figure 2:
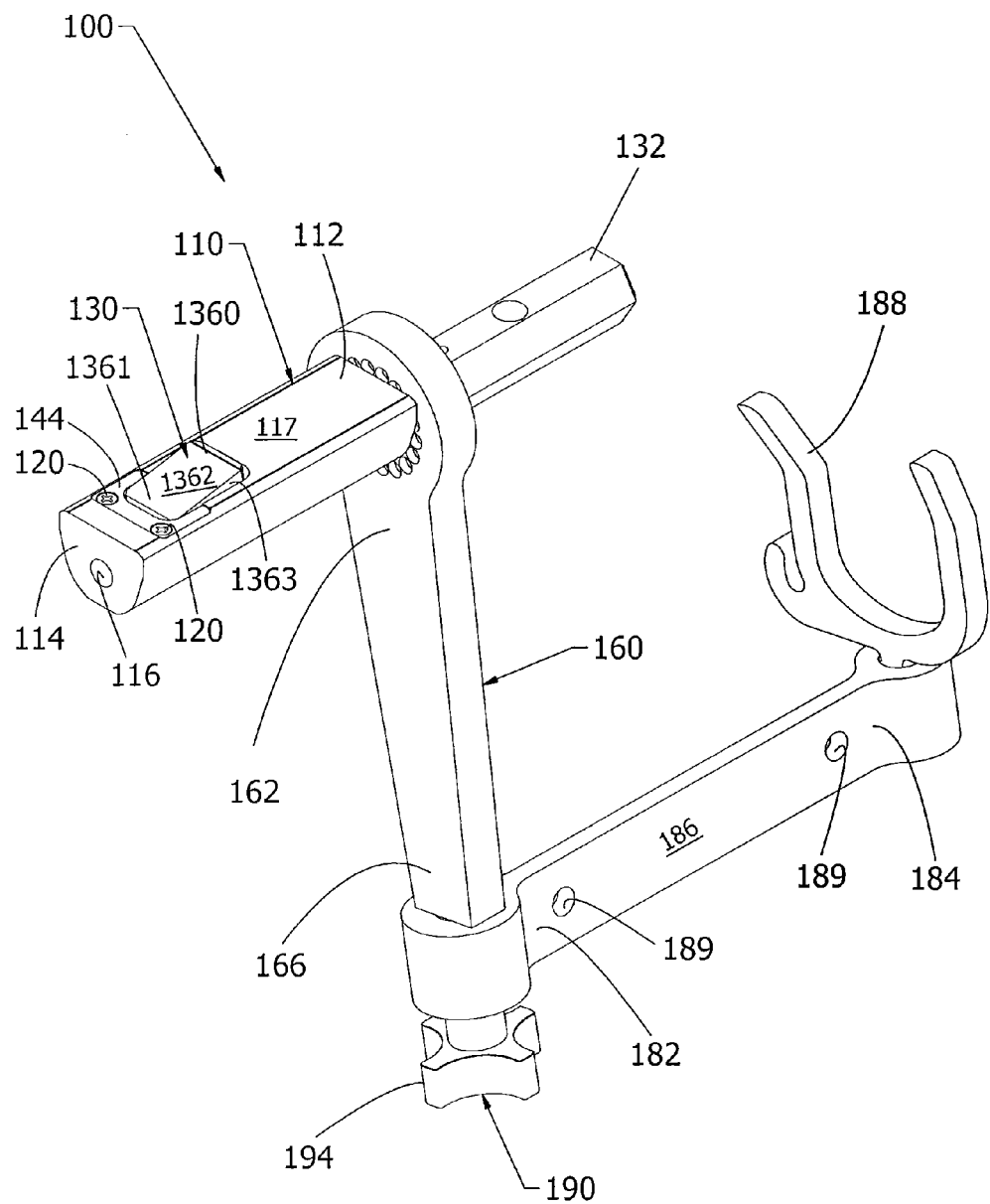
FIG. 2 illustrates a perspective view of the accessory device of the present invention.
Figure 3:
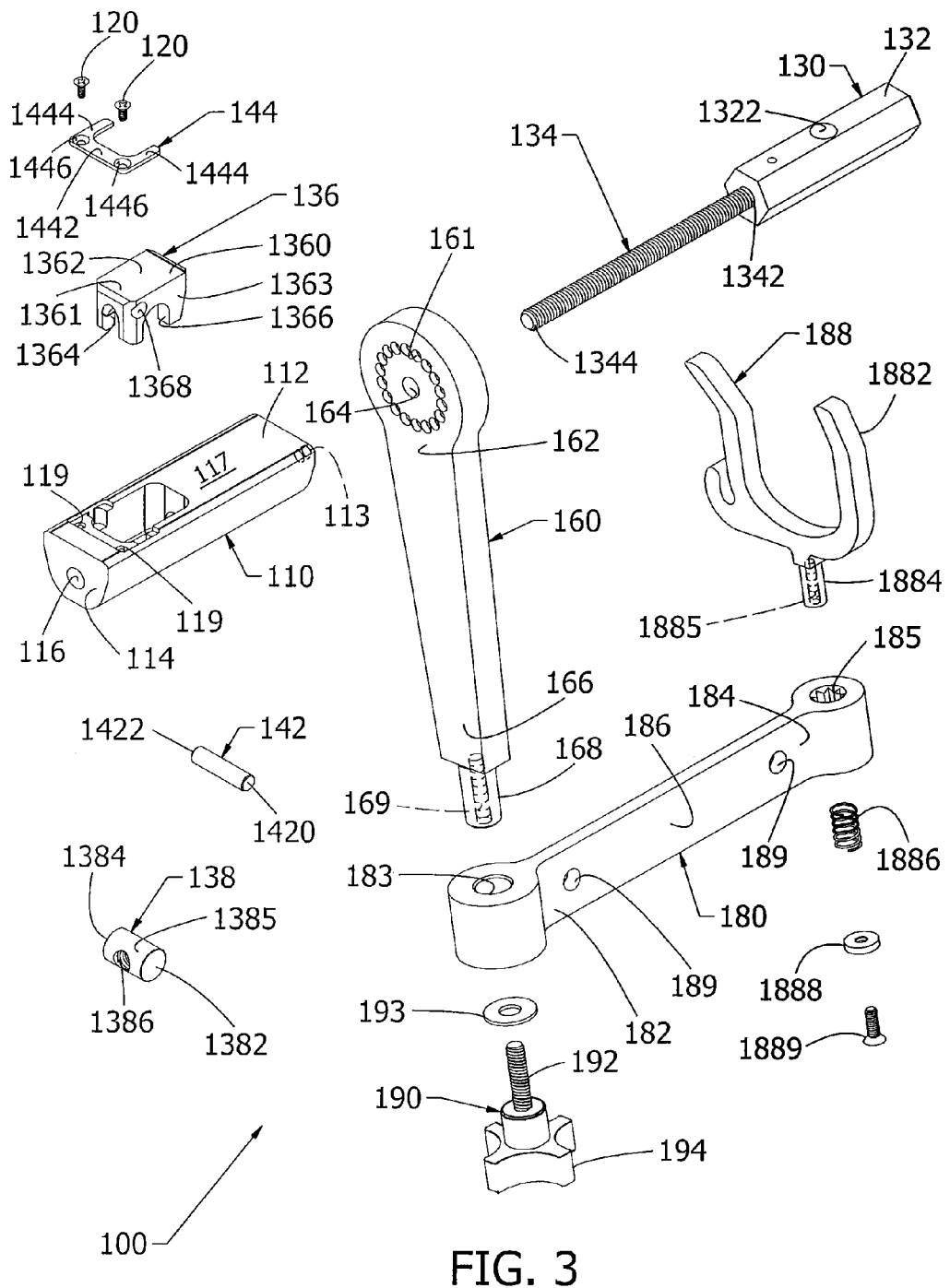
FIG. 3 illustrates an exploded perspective view of the accessory device of the present invention.

FIGS. 2 and 3 illustrate a perspective view of a preferred embodiment of a ladder accessory device 100 of the present invention, which is useful for temporarily storing tools and supplies (not shown) in an elevated work environment and out of the path of an individual ascending/descending the ladder. Device 100 is preferably comprised of a rung insert 110, a rung insert locking device 130, a support arm 160, a platform arm 180, and a platform arm locking device 190, each of which is described in more detail below. Unless otherwise stated herein, device 100 is preferably comprised of aluminum, or some other durable weather resistant material such as stainless steel or the like.

Rung insert 110 is preferably comprised of an inboard end 112 with a locking pin 113 extending outwardly therefrom, an outboard end 114 extending away from support arm 160, a continuous opening 116 in rung insert 110 extending between inboard end 112 and outboard end 114, a top surface 117, an opening 118 in said top surface 117 for receipt of a portion of rung insert locking device 130, wherein said opening 118 further comprises a notch 1182 therein, and one or more fastener openings 119 for receipt of a fastener 120, as described more fully below. As explained more fully below, when used in connection with prior art ladder 10, rung insert 110 is inserted into continuous opening 34 of prior art ladder rung 30. Therefore, the size and shape of rung insert 110 should generally correspond to that of continuous opening 34 of rung 30.

Rung insert locking device 130 is preferably comprised of a handle 132 with an opening 1322 therein, a threaded elongated member 134 further comprised of a first end 1342 and a second end 1344, a selectively positionable insert 136, a cam 138, a pin 142 and a bracket 144. Handle 132 and elongated member 134 may be integrally formed as a single component, or they may be two separate components with handle 132 fixedly attached to first end 1342 of elongated member 134. Opening 1322 is useful for assisting a user to rotate handle 132 in a clockwise or counterclockwise direction, as explained more fully below.

As described more fully below, support arm 160 is positioned along, and radially repositionable about, first end 1342 of elongated member 134, immediately adjacent to handle 132 as best shown in FIGS. 2 and 3. More specifically, elongated member 134 passes through a continuous opening 164 in support arm 160 and extends into opening 116 of rung insert 110. Additionally, in the preferred embodiment of the present invention, there are a plurality of radially spaced apart openings 161 along the surface of support arm 160 facing rung insert 110 for receipt of locking pin 113 as described more fully below.

Selectively positionable insert 136 is positioned partially within opening 118 and is further comprised of a first end 1360, a second end 1361, top surface 1362, opposing side surfaces 1363, a continuous opening 1364 that extends between said first end 1360 and said second end 1361 for receipt of elongated member 134, a second continuous opening 1366 that extends between said opposing side surfaces 1363 for receipt of cam 138, and a third continuous opening 1368 that extends between said opposing side surfaces 1363 near second end 1361 for receipt of pin 142.

Cam 138 is a generally cylindrical, elongated member that is comprised of a first end 1382, a second end 1384, an exterior surface 1385, and a continuous threaded opening 1386 in said exterior surface 1385. Cam 138 is positioned within second continuous opening 1366, and generally extends between opposing side surfaces 1363 of insert 136. Threaded elongated member 134 engages the threads formed in continuous opening 1386 of cam 138.

Pin 142 is a generally cylindrical, elongated member that is comprised of a first end 1420 and a second end 1422. Pin 142 is positioned within third continuous opening 1368 of insert 136 and extends between said opposing side surfaces 1363 near second end 1361 and into notch 1182, which allows for pivotal movement of insert 136.

Bracket 144 is generally c-shaped and comprised of a body portion 1442, a pair of spaced apart arms 1444 extending outwardly from said body portion 1442, and one or more continuous openings 1446 in said bracket 144 for receipt of fastener 120 for securing said bracket to said rung insert 110. Once bracket 144 has been secured, pin 142 becomes captivated within notch 1182.

Figure 5A:
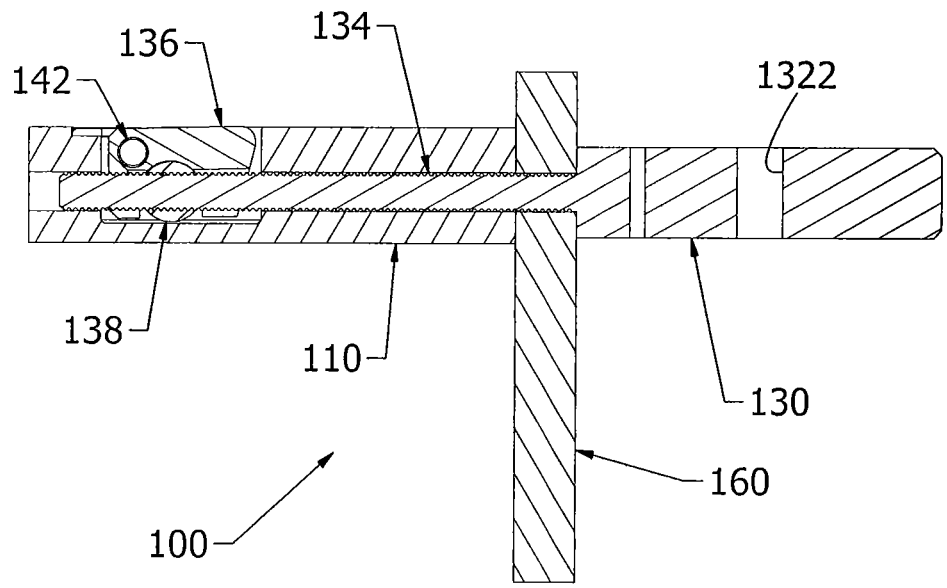
FIG. 5A illustrates a perspective, cross-sectional view of the rung insert locking device in an unlocked position, and the upper portion of the support arm.
Figure 5B:
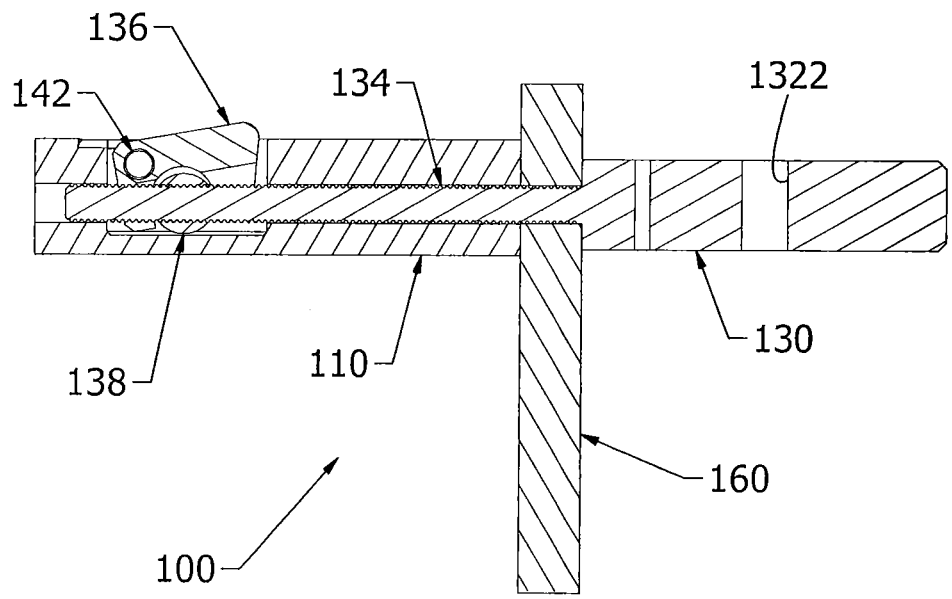
FIG. 5B illustrates a perspective, cross-sectional view of the rung insert locking device in a locked position, and the upper portion of the support arm.

Clockwise rotation of handle 132 first brings about a tightening of rung insert 110, support arm 160, and handle 132 due to the interaction of the threads formed in continuous opening 1386 of cam 136 and the threads formed in elongated member 134 extending from handle 132. Once the gap between said components is closed, additional clockwise rotation of handle 132 will cause cam 138 to traverse along threaded elongated member 134 in a direction towards support arm 160. Cam 138 will continue to move freely until exterior surface 1385 contacts opening 1366 formed within insert 136. Additional clockwise rotation of handle 132 will create contact forces between exterior surface 1385 and opening 1366. As a result, cam 138 will begin to slide within continuous opening 1366 due to its generally oblong-shaped configuration. As the sliding action of the two corresponding surfaces takes place, insert 136 will pivot about pin 142. Insert 136 will continue to pivot until locking device 130 reaches its maximum locking position, or until first end 1360 contacts the continuous opening 34 formed in the rung 30 of ladder 10. At this point, additional clockwise rotation of handle 132 will only serve to tighten the components mentioned above. Locking device 130 may be loosened and disassembled by rotating handle 132 in a counter-clockwise direction. The preferable embodiment described herein utilizes common right-handed threads, however left-handed threads may also be used as well. FIG. 5A illustrates a perspective, cross-sectional view of the rung insert locking device 130 in an unlocked position, and the upper portion of support arm 160. FIG. 5B illustrates a perspective, cross-sectional view of the rung insert locking device 130 in a locked position, and the upper portion of support arm 160.

Support arm 160 is preferably an elongated member comprised of an upper end 162 positioned nearest to rung insert 110 and with a continuous opening 164 therein for receipt of elongated member 134, a plurality of radially spaced apart openings 161 along the surface of upper end 162 of support arm 160 and facing rung insert 110 for receipt of locking pin 113, and a lower end 166 that extends outwardly from rung insert 110. Lower end 166 further comprises a generally cylindrical extension arm 168 with a longitudinal threaded opening 169 therein for receipt of platform arm locking device 190, as explained more fully below. When rung insert locking device 130 is in an unlocked position, support arm 160 may be radially re-positioned about elongated member 134 of rung insert locking device 130 and into a desired orientation, and rung insert 110 may be inserted within opening 34 of rung 30. Once the desired orientation is achieved and the rung insert 110 has been inserted into a rung opening 34, rung insert locking device 130 may be moved to a locked position by rotating handle 132 in a clockwise, thereby causing (i) locking pin 113 to be inserted into a select one of openings 161 in support arm 160 and (ii) top surface 1362 of insert 136 to extend out of opening 118 and frictionally engage the interior surface of rung 30 and support arm 160 to be fixed between handle 132 and rung insert 110. Once in the locked position, rung insert locking device 130 generally prevents the removal of rung insert 110 from rung opening 34 as well as the rotation of support arm 160 about elongated member 134 due to locking pin 113. Similarly, to unlock rung insert locking device 130, the user will simply turn handle 132 in a counterclockwise direction.

Figure 4:
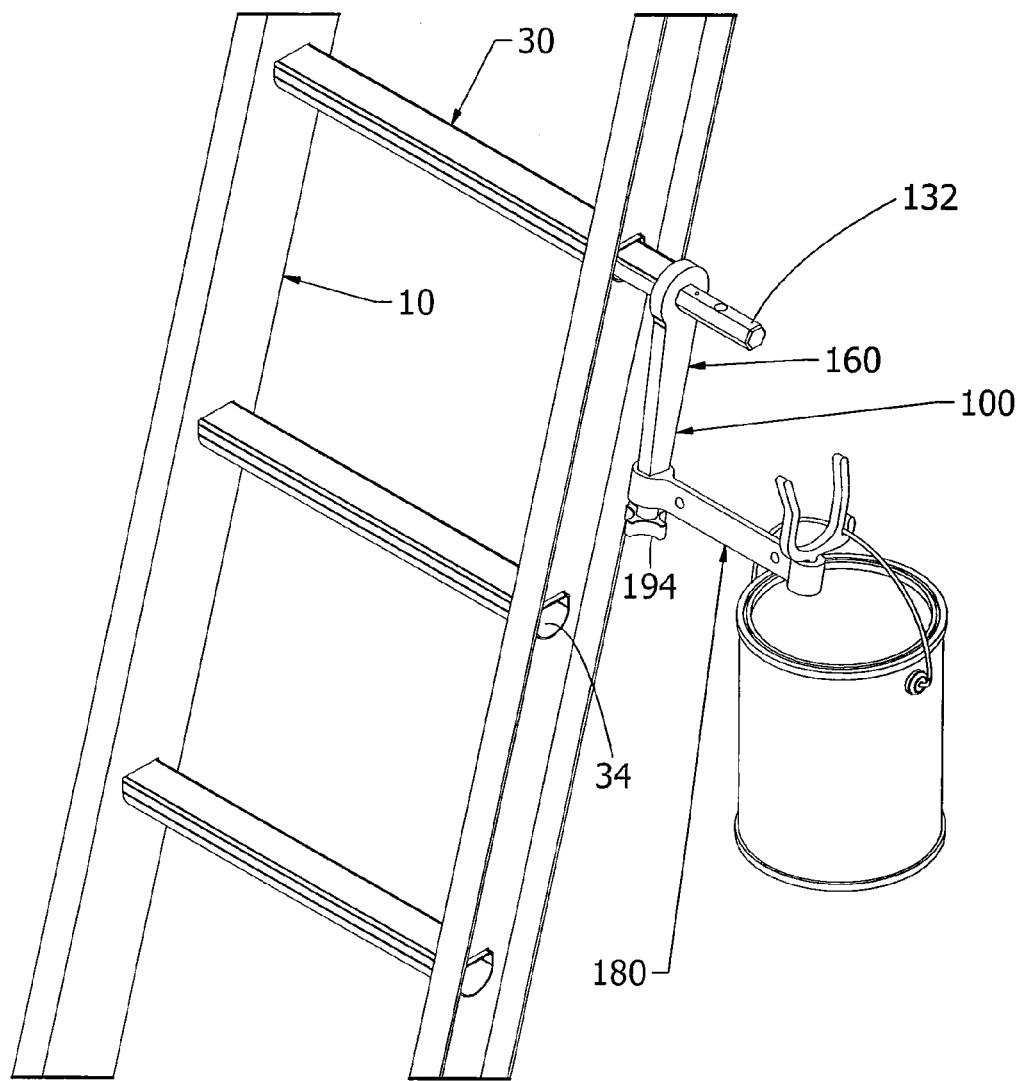
FIG. 4 illustrates a perspective view of the accessory device of the present invention installed on the prior art extension ladder of FIG. 1.

Platform arm 180 is preferably an elongated member comprised of an inboard end 182 positioned nearest to support arm 160 and having a continuous opening 183 therein for receipt of extension arm 168, an outboard end 184 that extends outwardly from support arm 160 and also has a continuous opening 185 therein for receipt of an accessory 188, and an exterior surface 186. A wide variety of accessories 188 may be removably attached to outboard end 184 of platform arm 180. For example, FIGS. 2-4 shows a generally fork like accessory 188 for supporting a cordless drill (not shown) attached to outboard end 184 of platform arm 180. In a preferred embodiment of the present invention, accessory 188 is further comprised of a generally "w-shaped" body portion 1882, a stem insert 1884 extending from said body portion for insertion into opening 185 (which may be configured in a pattern to correspond to the shape of stem insert 1884 to prevent rotation of stem insert 1884 within opening 185) with a threaded opening 1885 therein, a compression spring 1886, a washer 1888 and a fastener 1889 such as a screw or a bolt, as is shown in FIG. 3, for insertion into threaded opening 1885. The exterior surface 186 of platform arm 180 may also be scored or otherwise comprise a nonslip portion to permit secure handling of device 100 or comprise one or more grooves or continuous openings 189 for receipt, for example, of a paint can handle or other device (not shown).

Platform arm locking device 190 is preferably comprised of an elongated threaded portion 192, a washer 193 and a handle 194. More specifically, once platform arm 180 is installed onto support arm 160 by inserting extension arm 168 into continuous opening 183, threaded portion 192 and washer 193 may be screwed into threaded opening 169 to secure platform arm 180 to support arm 160. As previously stated, platform arm 180 may be radially repositioned about extension arm 168 into a desired orientation. Once the desired orientation is achieved, handle 194 may be turned in a clockwise direction to tighten the connection between support arm 160 and platform arm 180, thereby preventing further rotation of platform arm 180 about extension arm 168.

Having now described the overall structure of the accessory device 100 of the present invention, its use and usefulness will now be summarized. A user (not shown) desiring to use device 100 with a prior art ladder rung 30 with an opening 34 therein would simply ascend the ladder 10 to the desired height and insert rung insert 110 into opening 34 of rung 30 with rung insert locking device 130 in an unlocked position (meaning that insert 136 is in a retracted position). Once rung insert 110 is positioned within opening 34 and support arm 160 is positioned in a desired orientation radially about elongated member 134, the user would turn handle 132 in a clockwise direction, thereby causing (i) elongated member 134 to thread into corresponding opening 116 of rung insert 110, (ii) top surface 1362 of insert 136 to contact and frictionally engage the interior surface of rung 30 and (iii) locking pin 113 to engage a select one of said plurality of radially spaced apart openings 161 along the surface of support arm 160 facing rung insert 110. Once in the locked position, rung insert locking device 130 generally prevents the removal of rung insert 110 from rung opening 34, as well as the rotation of support arm 160 about elongated member 134 due to the presence of locking pin 113 in one of openings 161. The user (not shown) may then rotate platform arm 180 about support arm 160 into a desired position and tighten handle 194 to prevent further rotation of platform arm 180 about extension arm 168 of support arm 160. As previously described, accessory(ies) 188 may be removably attached to platform arm 180 to support, for example, tools and or materials.

Figure 6:
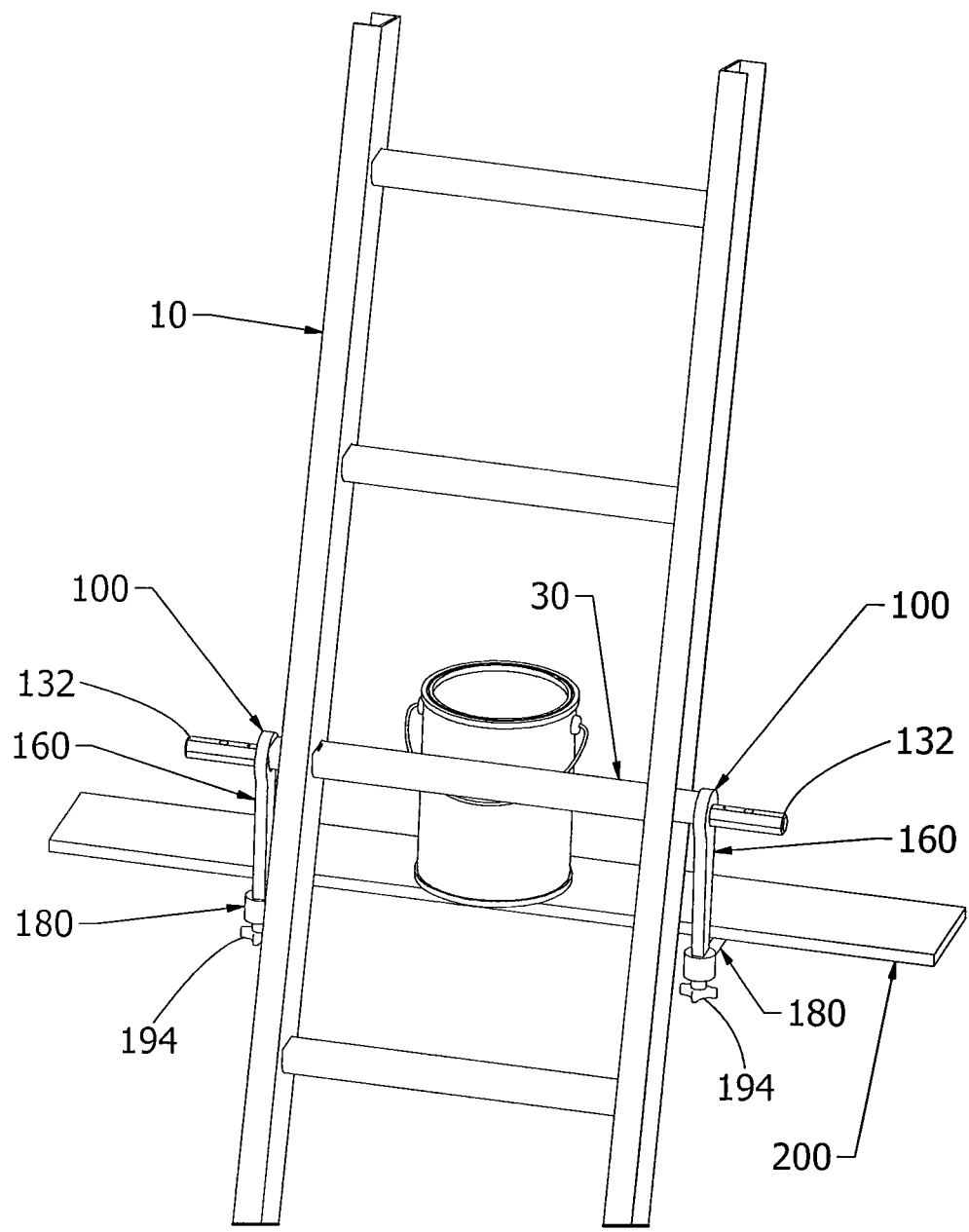
FIG. 6 illustrates a perspective view of two accessory devices being used in tandem to support a work platform.

As illustrated in FIG. 6, it is also possible to insert two devices 100 into opening 34 of the same rung 30 from opposing sides to support a work platform 200 between the ladder 10 and the structure upon which it rests. More specifically, the platform arms 180 of each device 100 would be rotated about their respective support arm 160 so that they extend outwardly from the support arm 160 in approximately the same direction. Work platform 200 can then be placed on top of the two platform arms to form a work shelf or platform for tools, supplies and the like.

Consequently, the ladder accessory of the present invention enables a user to removably but securely attach the device to a ladder, such as an extension ladder, and function as an elevated work platform for the temporary storage of tools and supplies. The ladder accessory device of the present invention can also be relatively easily positioned and repositioned along the outside rail of a ladder and out of the path of an individual ascending/descending the ladder, thereby greatly improving safety without sacrificing accessibility. Finally, the ladder accessory device of the resent invention is relatively inexpensive to manufacture, and safe and easy to use.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A ladder accessory device comprising:
  a rung insert;
  a rung insert locking device, wherein said rung insert locking device comprises a handle portion, an elongated member, an insert, a cam, and a pin;
  a support arm;
  a platform arm; and
  a platform arm locking device.

2. The ladder accessory device of claim 1 wherein said support arm is capable of being rotated about said rung insert locking device.

3. The ladder accessory device of claim 1 wherein said platform arm is capable of being rotated about said support arm.

4. The ladder accessory device of claim 1 wherein said rung insert locking device is repositionable between a locked position and an unlocked position.

5. The ladder accessory device of claim 1 wherein said insert is repositionable between an extended position and a retracted position by rotating said handle portion.

6. The ladder accessory device of claim 1 wherein said platform arm locking device comprises a handle and a threaded portion and is repositionable between a locked position and an unlocked position, wherein said platform arm is capable of being rotated about said support arm when said platform arm locking device is in the unlocked position.

7. A ladder accessory device comprising:
  a rung insert;
  a rung insert locking device comprising a handle portion and a repositionable insert;
  a support arm that is capable of being rotated about said rung insert locking device;
  a platform arm that is capable of being rotated about said support arm; and
  a platform arm locking device, wherein said rung insert further comprises a locking pin for selectively engaging one of a plurality of radially spaced apart openings in said support arm and further wherein said support arm is prohibited from rotating about said rung insert locking device when said locking pin is engaged in said one of a plurality of radially spaced apart openings in support arm.

8. The ladder accessory device of claim 7 wherein rotating said handle portion of rung insert locking device causes repositionable insert to move between a locked position and an unlocked position.

9. The ladder accessory device of claim 7 wherein rotating said handle portion of rung insert locking device causes locking pin to engage said one of a plurality of radially spaced apart openings in support arm.

10. The ladder accessory device of claim 7 wherein said platform arm further comprises a first end that is attached to said support arm, and a second end.

11. The ladder accessory device of claim 10 further comprising an accessory, wherein said accessory is attached to said second end of said platform arm.

12. The ladder accessory device of claim 7 wherein said rung insert locking device further comprises an elongated member, an insert, a cam, and a pin.

13. The ladder accessory device of claim 7 wherein said platform locking device is repositionable between a locked position and an unlocked position, wherein said platform arm is prevented from rotating about said support arm when said platform locking device is in a locked position.

14. The ladder accessory device of claim 7 wherein said platform arm is further comprised of at least one notch for suspending an object therefrom.

15. A ladder accessory device comprising:
  a rung insert comprising a locking pin;

a rung insert locking device further comprising a handle portion, an elongated member, a repositionable insert, a cam, and a pin;

a support arm that is capable of being rotated about said rung insert locking device and is further comprised of a plurality of radially spaced apart openings;

a platform arm that is capable of being rotated about said support arm;

a platform arm locking device that is repositionable between a locked position and an unlocked position; and an accessory for attachment to said platform arm, wherein said accessory is capable of supporting a tool.

16. The ladder accessory device of claim 15 wherein said platform arm is prevented from rotating about said support arm when said platform locking device is in a locked position.

17. The ladder accessory device of claim 15 wherein said support arm is prohibited from rotating about said rung insert locking device when said locking pin is engaged in one of said plurality of radially spaced apart openings.

* * * * *